United States Patent
Masek

(10) Patent No.: US 11,584,115 B2
(45) Date of Patent: Feb. 21, 2023

(54) METHOD OF MANUFACTURING HYBRID PARTS CONSISTING OF METALLIC AND NON-METALLIC MATERIALS AT HIGH TEMPERATURE

(71) Applicant: Zapadoceska univerzita v Plzni, Plzen (CZ)

(72) Inventor: Bohuslav Masek, Kaznejov (CZ)

(73) Assignee: Zapadoceska Univerzita v Plzni, Plzen (CZ)

( * ) Notice: Subject to any disclaimer, the term of this patent is extended or adjusted under 35 U.S.C. 154(b) by 422 days.

(21) Appl. No.: 16/802,316

(22) Filed: Feb. 26, 2020

(65) Prior Publication Data

US 2021/0237417 A1 Aug. 5, 2021

(30) Foreign Application Priority Data

Jan. 31, 2020 (CZ) .................................. CZ2020-46

(51) Int. Cl.
| | |
|---|---|
| *B21D 1/00* | (2006.01) |
| *B32B 37/06* | (2006.01) |
| *B32B 37/08* | (2006.01) |
| *C03C 27/00* | (2006.01) |
| *C03C 27/02* | (2006.01) |

(52) U.S. Cl.
CPC .............. *B32B 37/06* (2013.01); *B32B 37/08* (2013.01); *C03C 27/00* (2013.01); *C03C 27/02* (2013.01)

(58) Field of Classification Search
CPC ....................................................... B21D 1/00
See application file for complete search history.

(56) References Cited

U.S. PATENT DOCUMENTS

2016/0177410 A1 6/2016 Masek et al.

FOREIGN PATENT DOCUMENTS

| CA | 2759154 A1 | | 5/2013 |
|---|---|---|---|
| CN | 108856441 | * | 1/2020 |
| CZ | 305990 B6 | | 6/2016 |

* cited by examiner

*Primary Examiner* — Jacob B Marks
(74) *Attorney, Agent, or Firm* — Hovey Williams LLP

(57) ABSTRACT

This invention generally relates to a method of manufacturing hybrid parts comprising metallic and non-metallic materials at high temperature. During the method, a hollow metallic feedstock heated to a temperature in the austenite region may be placed in a die and filled with a non-metallic material in a viscous condition, after which the feedstock in the die is formed and then controlled-cooled to cause hardening of the non-metallic material in the region of contact between the metallic and non-metallic material. Afterwards, the semi-finished product is removed from the die and cooled to room temperature. The rate of cooling may be adjusted to generate compressive stress in the surface layer of the non-metallic material, which reduces the risk of cracking.

3 Claims, No Drawings

METHOD OF MANUFACTURING HYBRID PARTS CONSISTING OF METALLIC AND NON-METALLIC MATERIALS AT HIGH TEMPERATURE

RELATED APPLICATIONS

This application claims the foreign priority benefit of Czech Patent Application Serial No. PV 2020-46 entitled "METHOD OF MANUFACTURING HYBRID PARTS CONSISTING OF METALLIC AND NON-METALLIC MATERIALS AT HIGH TEMPERATURE," filed Jan. 31, 2020, the entire disclosure of which is incorporated herein by reference.

FIELD OF INVENTION

This invention generally relates to a method for manufacturing hybrid parts comprising metallic and non-metallic materials at high temperature.

BACKGROUND ART

A majority of parts made by forming of metals and alloys generally consist of a single material. Typically, hot closed-die forging is the most widespread and exemplary process for producing steel parts. In this process, a steel feedstock is heated to a forming temperature and then gradually formed in cavities of a die to a shape which corresponds to the required contour of the resulting forged part. Typical final operations include trimming and sizing of the forged part. The forged part is then heat treated by a procedure which is specific to its material and governs the mechanical properties of the product. Hollow parts are typically manufactured by either drilling away the core of a solid forged part or by applying internal pressure through a medium in a die. In the latter case, the medium is fed into a cavity in the feedstock, thereby causing the feedstock to expand and have its outer surface cling to the surface of the die cavity. The advantage of this procedure is that it leads to considerably more lightweight products than solid products without light interior. The disadvantage of hollow shafts is their limited ability to transmit torque due to risk of instability. Instability occurs when the structure collapses due to overload, which causes distortion of the entire part. Solid parts which have no lightweighting cavities typically do not experience this type of collapse of structure. The disadvantage of a solid part is its large weight and the related high costs of material and greater energy consumption in production.

One compromise solution may involve the use of hybrid parts made of two or more materials. For instance, Canadian Patent Application Publication No. CA2759154 describes synthesizing hybrid materials from two groups of metallic materials. The first group comprises aluminium, magnesium, and zirconium alloys and the other contains stainless, carbon, or tool steels and nickel and titanium alloys. Czech Patent No. CZ305990 also describes a hybrid part consisting of a steel casing filled with an aluminium alloy. Thus, today's production of formed hybrid parts only involves combinations of crystalline metallic materials whose specific weight constrains their potential for lightweighting.

SUMMARY

One or more embodiments generally concern a method of manufacturing hybrid parts comprising metallic materials and non-metallic materials. Generally, the method comprises: (a) heating a hollow feedstock of a metallic material to a temperature in the austenite region to thereby provide a heated hollow feedstock; (b) placing the heated hollow feedstock in a die; (c) filling the heated hollow feedstock with a non-metallic material in a viscous condition; (d) forming the heated hollow feedstock in the die to thereby provided a formed feedstock; (e) cooling the formed feedstock under controlled conditions to cause hardening of the non-metallic material in a region of contact between the metallic material and the non-metallic material to thereby form a semi-finished product; (f) removing the semi-finished product from the die to thereby provide a removed product; and (g) cooling the removed product to room temperature.

DETAILED DESCRIPTION

The above drawbacks and weight limits in hot-formed hybrid parts are eliminated by a method of manufacturing hybrid parts comprising, consisting essentially of, or consisting of metallic and non-metallic materials. In one or more embodiments, the method involves heating a hollow stock of a suitable steel to a hot-forming temperature, after which the stock may be placed in a split die and filled with glass at a temperature corresponding to its viscous condition while ensuring that the glass fills as large a portion of the cavity as possible. Subsequently, punches may then be inserted in the axial direction into the cavity of the stock, where the force acting on them in the axial direction causes hydrostatic pressure in the glass, which makes the steel stock expand and fill the die cavity, by which the desired shape of the steel part is obtained. After that, the part may be removed from the die and cooled in a controlled manner to thereby attain the desired mechanical properties in the steel portion and to harden the glass. Cooling at an appropriate rate can lead to a higher compressive stress in the glass layers, which are in contact with the metal. Consequently, this can effectively prevent the destruction of the glass filling. This phenomenon is strengthened by the fact that the shrinkage of the metal casing is greater than that of the glass filling, which contributes to the stabilization of the structure and the creation of compressive stress in the surface layer of the glass filling. In order to maintain the hydrostatic pressure in the glass filling, either the punches can be kept as end plugs in the structure and affixed either by mechanical joining, welding, or another joining technique. In certain embodiments, the above-mentioned ends may be manufactured from a different steel or another material, depending on the specific requirements for mechanical properties and, if relevant, other physical, functional, or technological properties.

In one or more embodiments, a steel tube may be heated, such as to a temperature of 1050° C. Afterwards, in the steel tube may be placed in a vertical position into a split die with a shaped cavity at a temperature of 150 to 200° C. The bottom end may be provided with a sealable punch so that a defined amount of glass at a designated temperature, such as 750° C., can be introduced through the top end into the tube. Subsequently, the space holding the glass may be sealed with a punch and an axial deformation force may be applied. The resulting deformation may cause lateral expansion where contact between the steel casing and the die surface causes the steel to cool below the Ac1 temperature. When the temperature of 700° C. is reached, the hybrid semi-finished product may be removed from the die. Afterwards, the punches may be pressed in, which produces a strong joint with the casing. In certain embodiments, the pressing operation can be substituted with laser welding.

Where required, final sizing can be performed to obtain higher geometric accuracy of the product. The final step involves gradual cooling in still air to room temperature.

This invention generally relates to a method of manufacturing hybrid parts comprising metallic and non-metallic materials at high temperature. During the method, a hollow metallic feedstock heated to a temperature in the austenite region may be placed in a die and filled with a non-metallic material in a viscous condition, after which the feedstock in the die is formed and then controlled-cooled to cause hardening of the non-metallic material in the region of contact between the metallic and non-metallic material. Afterwards, the semi-finished product may be removed from the die and cooled to room temperature. The rate of cooling may be adjusted to generate compressive stress in the surface layer of the non-metallic material, which reduces the risk of cracking This invention can find broad use in the manufacture of lightweight structural parts made by hot plastic deformation and for making shafts or other rotation-symmetric parts able to transmit torque. Furthermore, the procedure can also be used for making camshafts or other parts of a non-symmetric cross section, including K-sections and other multiple-sided sections.

This invention can be further illustrated by the following examples of embodiments thereof, although it will be understood that these examples are included merely for the purposes of illustration and are not intended to limit the scope of the invention unless otherwise specifically indicated.

EXAMPLES

Example 1

A steel tube of 50/4 mm diameter from 38MnSiVS5 material was heated to 1050° C. Then it was placed in a vertical position into a split die with a shaped cavity at a temperature of 150 to 200° C. The bottom end was provided with a sealable punch so that a defined amount of glass at 750° C. could be introduced through the top end into the tube. Immediately thereafter the space with the glass was sealed with a top punch and axial deformation force was applied. The deformation caused lateral expansion where contact between the steel casing and the die surface caused the steel to cool below Ac1. When the temperature of 700° C. was reached, the hybrid semi-finished product was removed from the die. Then the punches were pressed in, which produced a strong joint with the casing.

Definitions

It should be understood that the following is not intended to be an exclusive list of defined terms. Other definitions may be provided in the foregoing description, such as, for example, when accompanying the use of a defined term in context.

As used herein, the terms "a," "an," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination, B and C in combination; or A, B, and C in combination.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "having," "has," and "have" have the same open-ended meaning as "comprising," "comprises," and "comprise" provided above.

As used herein, the terms "including," "include," and "included" have the same open-ended meaning as "comprising," "comprises," and "comprise" provided above.

Numerical Ranges

The present description uses numerical ranges to quantify certain parameters relating to the invention. It should be understood that when numerical ranges are provided, such ranges are to be construed as providing literal support for claim limitations that only recite the lower value of the range as well as claim limitations that only recite the upper value of the range. For example, a disclosed numerical range of 10 to 100 provides literal support for a claim reciting "greater than 10" (with no upper bounds) and a claim reciting "less than 100" (with no lower bounds).

CLAIMS NOT LIMITED TO DISCLOSED EMBODIMENTS

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as it pertains to any apparatus not materially departing from but outside the literal scope of the invention as set forth in the following claims.

What is claimed is:

1. A method of manufacturing hybrid parts comprising metallic materials and non-metallic materials, the method comprising:
   (a) heating a hollow feedstock of a steel material to a temperature in the austenite region to thereby provide a heated hollow feedstock;
   (b) placing the heated hollow feedstock in a die;
   (c) filling the heated hollow feedstock with a non-metallic material in a viscous condition;
   (d) forming the heated hollow feedstock in the die to thereby provide a formed feedstock;
   (e) cooling the formed feedstock under controlled conditions to cause hardening of the non-metallic material in a region of contact between the metallic material and the non-metallic material to thereby form a semi-finished product;
   (f) removing the semi-finished product from the die to thereby provide a removed product; and
   (g) cooling the removed product to room temperature.

2. The method of manufacturing hybrid parts according to claim 1, wherein the cooling of step (e) is controlled to generate compressive stress in a surface layer of the non-metallic material to thereby reduce the risk of cracking.

3. The method of forming hybrid parts according to claim 1, wherein the non-metallic material comprises glass.

* * * * *